(12) United States Patent
Cohen et al.

(10) Patent No.: US 6,834,565 B2
(45) Date of Patent: Dec. 28, 2004

(54) RETROFIT SAFETY HANDLEBAR

(75) Inventors: Jeremy Mark Cohen, Jenkintown, PA (US); Luis Otoya, Arlington, VA (US); Kristy Bittenbender Arbogast, Media, PA (US); Flaura Koplin Winston, Narberth, PA (US)

(73) Assignee: The Children's Hospital of Philadelphia, Philadelphia, PA (US)

( * ) Notice: Subject to any disclaimer, the term of this patent is extended or adjusted under 35 U.S.C. 154(b) by 0 days.

(21) Appl. No.: 10/157,401

(22) Filed: May 29, 2002

(65) Prior Publication Data

US 2003/0233904 A1 Dec. 25, 2003

Related U.S. Application Data

(63) Continuation-in-part of application No. 09/675,743, filed on Sep. 29, 2000.

(51) Int. Cl.[7] ............................................. B62K 21/26
(52) U.S. Cl. .................................. 74/551.9; 74/551.2
(58) Field of Search ........................... 74/551.1, 551.2, 74/551.8, 551.9, 519, 523, 558.5; 16/421, 422; 267/64.11, 64.15; 188/129, 281, 34

(56) References Cited

U.S. PATENT DOCUMENTS

| | | | |
|---|---|---|---|
| 593,222 A | 11/1897 | Humphrey | |
| 599,793 A | 3/1898 | Pihl | |
| 627,227 A | 6/1899 | Fenton et al. | |
| 778,573 A | 12/1904 | Dunsford | |
| 864,056 A | 8/1907 | Altenburger | |
| 1,303,803 A | 5/1919 | Kennedy | |
| 1,568,911 A | 1/1926 | O'Brien | |
| 2,456,267 A | 12/1948 | Gazda | |
| 2,462,381 A | 2/1949 | Gazda | |
| 3,804,446 A | 4/1974 | Warrener | |
| 4,461,057 A | 7/1984 | Unger | |
| 4,493,659 A | * 1/1985 | Iwashita | ............... 440/56 |
| 4,588,054 A | * 5/1986 | LeBaron | ............... 188/280 |
| 4,799,668 A | 1/1989 | Jansen | |
| 4,875,142 A | 10/1989 | Spector | |
| 5,236,170 A | 8/1993 | Johnsen | |
| 5,820,114 A | * 10/1998 | Tsai | ............... 267/202 |
| 5,934,154 A | 8/1999 | Noel | |
| 6,029,315 A | 2/2000 | Flower | |
| 6,367,125 B1 | 4/2002 | Lin | |
| 6,691,842 B1 | * 2/2004 | Lai | ............... 188/282.7 |
| 6,691,991 B1 | * 2/2004 | Huang | ............... 267/291 |
| 2003/0217615 A1 | 11/2003 | Menon et al. | |

OTHER PUBLICATIONS

Winston, *PEDIATRICS*, vol. 102 No. 3, "Hidden Spears: Handlebars as Injury Hazards to Children," (Sep. 1998).

* cited by examiner

Primary Examiner—David A. Bucci
Assistant Examiner—Vicky A. Johnson
(74) Attorney, Agent, or Firm—Caesar, Rivise, Bernstein, Cohen & Pokotilow, Ltd.

(57) ABSTRACT

The present invention relates to a retrofit safety handlebar. A handlebar is modified to include a threaded portion on an exterior end thereof. The handlebar can be a conventional handlebar. The retrofit safety handlebar includes a threaded portion on an interior thereof. The retrofit safety handlebar can be threaded to the conventional handlebar. A bias member is associated with a shaft of the retrofit safety handlebar for biasing the shaft away from a frame. A dampener is associated with the shaft so as to dampen movement of the shaft toward the frame after impact of the retrofit safety handlebar with a rider. For example, the frame can be a bicycle frame or a frame for other forms of personal transportation and toys that are pushed or ridden.

26 Claims, 6 Drawing Sheets

RETROFIT SAFETY HANDLEBAR

This application is a continuation in part of U.S. Ser. No. 09/675,743 filed Sep. 29, 2000 entitled SAFETY HANDLEBAR hereby incorporated by reference in its entirety into this application.

BACKGROUND OF THE INVENTION

1. Field of the Invention

The present invention relates to a safety handlebar for absorbing energy generated by impact of the rider with the handlebar which can be retrofit to a conventional frame such as a bicycle frame.

2. Description of the Related Art

Impact with a handlebar in slow speed bicycling crashes has been identified as a mechanism for causing life threatening truncal injuries in children. Severe abdominal injury is seldom immediately evident following bicycle trauma related accidents. A consequential injury that may result from such a handlebar accident is a traumatic abdominal wall hernia (TAWH). A TAWH is produced by a direct blow that is either blunt or may impact the skin with an insufficient force to puncture the skin. A TAWH occurs because the elasticity of the skin is greater than the other layers of the abdominal wall. The skin remains intact despite the fact that there may be significant disruption below the abdominal wall, i.e., muscle and fascia, thus causing a difficulty in detection. In the worst case scenario, bicycle handlebar trauma can cause death. Bicycle handlebar trauma is often hard to detect initially in a clinical atmosphere and may be further complicated by delayed injury.

In recent years, an increasing number of children have suffered severe abdominal trauma while riding their bicycles. Since this mechanism of injury has not been well described and abdominal trauma is difficult to detect without a thorough examination, many children are sent home and forced to return to the hospital when the symptoms become more severe. One particular form of accident is responsible for the majority of these injuries. This involves a rapid shift in momentum caused by the front tire of the bicycle coming into contact with a changing interface such as the transition from sidewalk to grass. This transition stops the bicycle and tends to rotate the front wheel and handlebars. The rider continues to move forward into an end of the handlebar and often hits the ground with the handlebar end still in contact with his/her abdomen. On impact, an additional blow is exerted by the handlebar on the rider, which is translated into the rider's abdominal area.

It would be beneficial to develop a handlebar which absorbs at least some of the energy generated by the impact of the rider with the handlebar, thereby reducing the amount of force transmitted to the rider as a result of the impact which can be retrofit to an existing bicycle.

BRIEF SUMMARY OF THE INVENTION

The present invention relates to a retrofit safety handlebar. A handlebar is modified to include a threaded portion on an exterior end thereof. The handlebar can be a conventional handlebar. The retrofit safety handlebar includes a threaded portion on an interior thereof. The retrofit safety handlebar can be threaded to the conventional handlebar. A bias member is associated with a shaft of the retrofit safety handlebar for biasing the shaft away from the conventional bicycle frame. A dampener is associated with the shaft so as to dampen movement of the shaft toward the frame after impact of the retrofit safety handlebar with a rider. For example, the frame can be a bicycle frame or a frame for other forms of personal transportation and toys that are pushed or ridden.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 3:
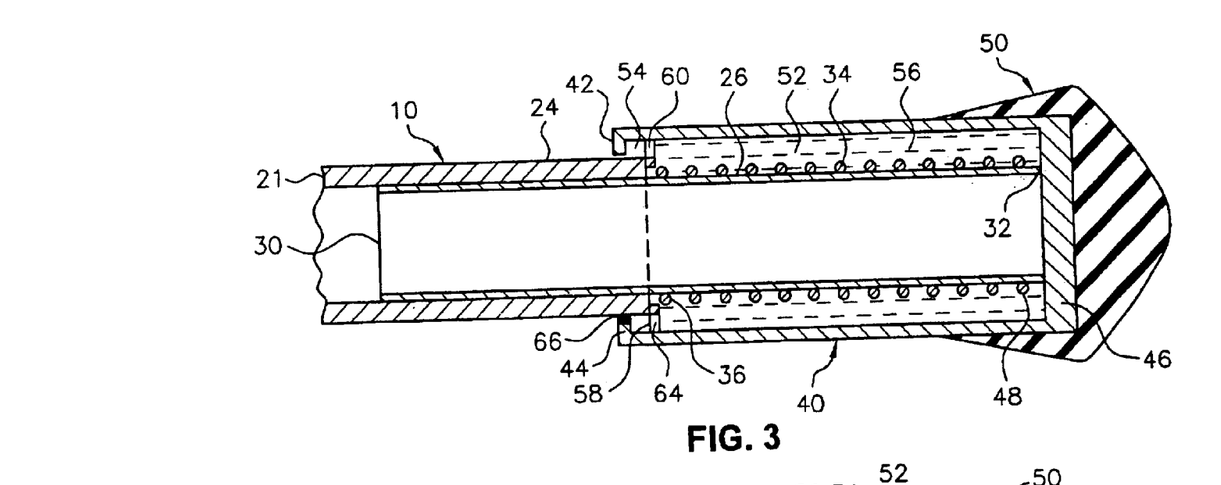
FIG. 3 is a cross-sectional view of an end of the handlebar in an uncompressed condition according to a first embodiment of the present invention.
Figure 4:
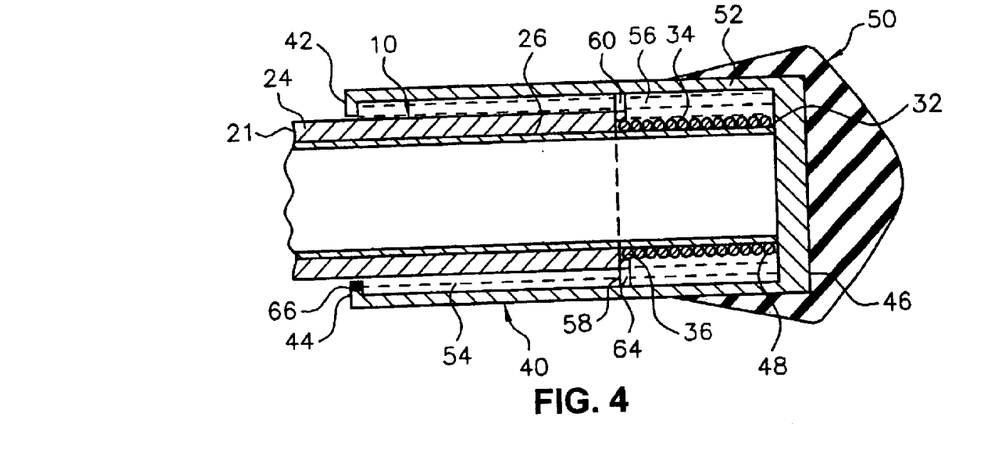
FIG. 4 is a cross-sectional view of the end of the handlebar in a compressed condition according to a first embodiment of the present invention.
Figure 5:
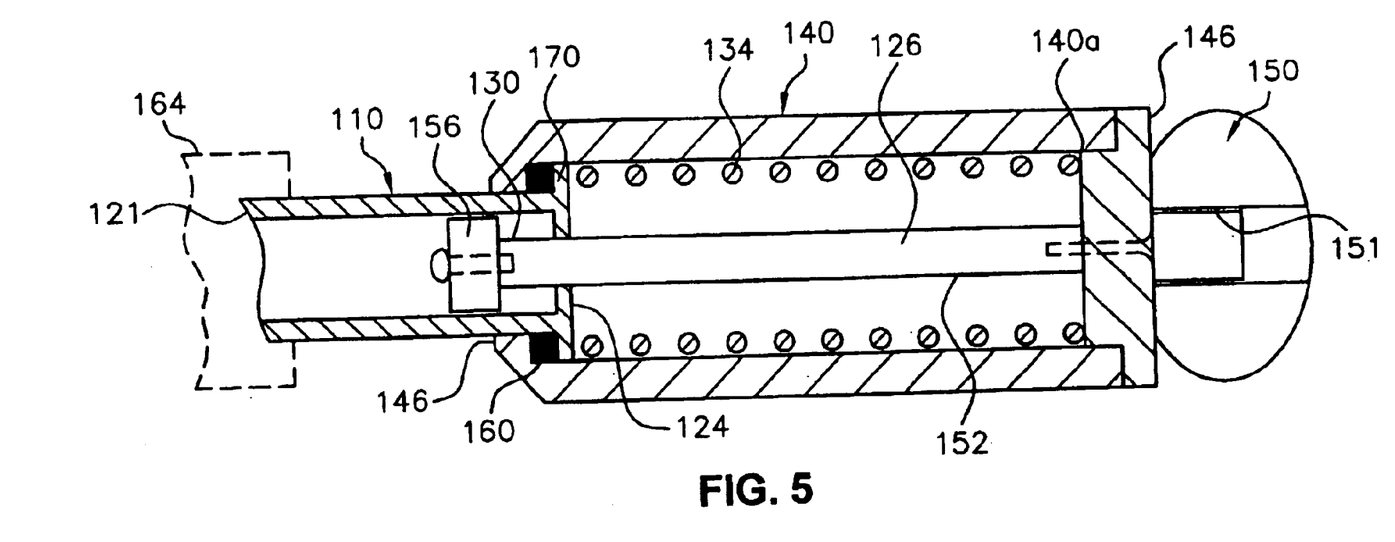
FIG. 5 is a cross-sectional view of an end of the handlebar in an uncompressed condition according to a second embodiment of the present invention.

Certain terminology is used in the following description for convenience only and is not limiting. The words "lower" and "upper" designate directions in the drawings to which reference is made. The words "inwardly" and "outwardly" refer to directions toward and away from, respectively, the geometric center of the handlebar and designated parts thereof. The words "inboard" and "outboard" refer to sides of elements proximate to and distal from, respectively, the geometric center of the handlebar and designated parts thereof. In FIGS. 3, 4 and 5, "inboard" refers to a direction toward the left-hand side of the figures refers to a direction toward the right-hand side of the figures. The words "left" and "right," as used herein, correspond to sides of the handlebar as viewed by a rider on a bicycle. The word "a" is defined to mean "at least one." The terminology includes the words above specifically mentioned, derivatives thereof and words of similar import. In the drawings, like numerals are used to indicate like elements throughout.

Figure 1:
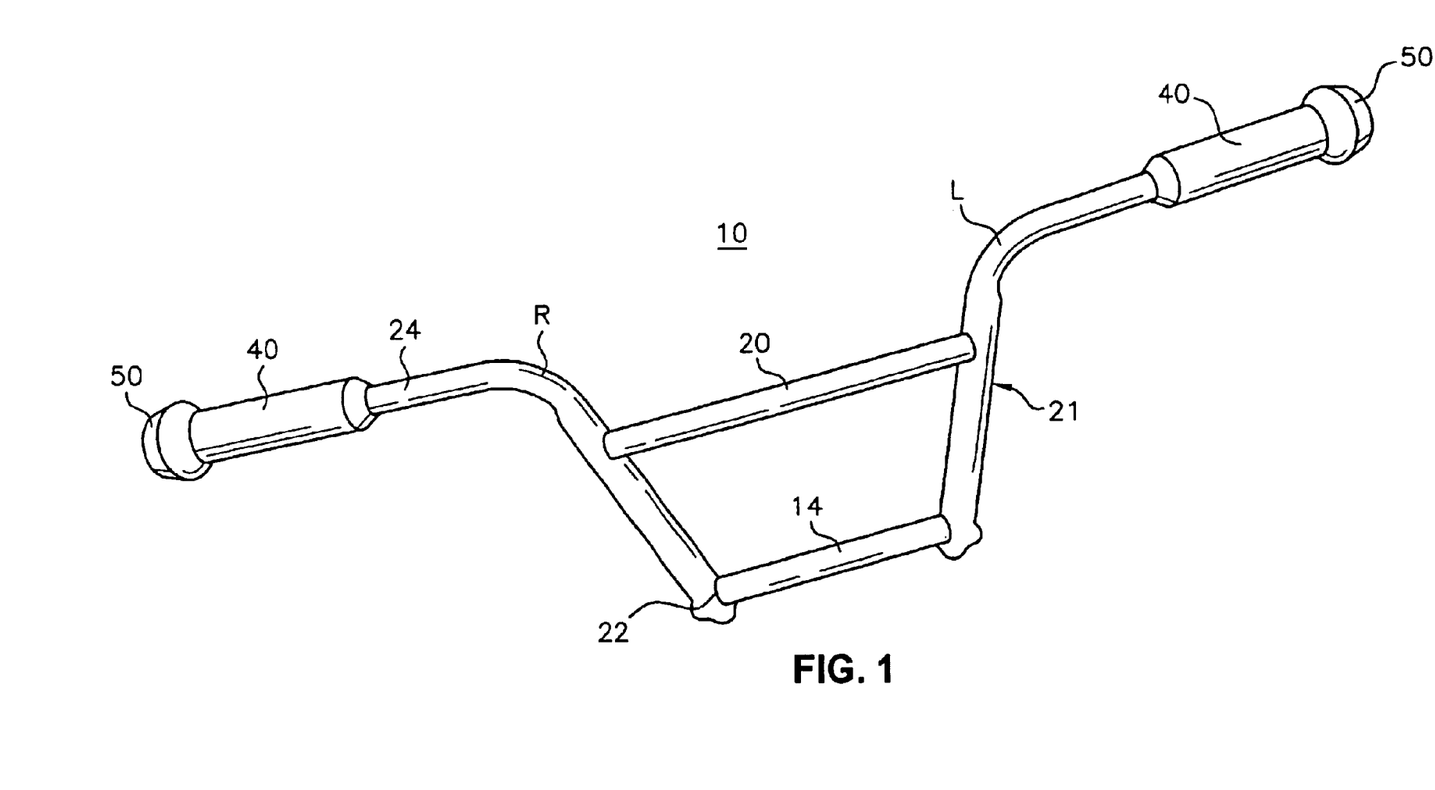
FIG. 1 is a front view of a handlebar in accordance with the present invention.
Figure 2:
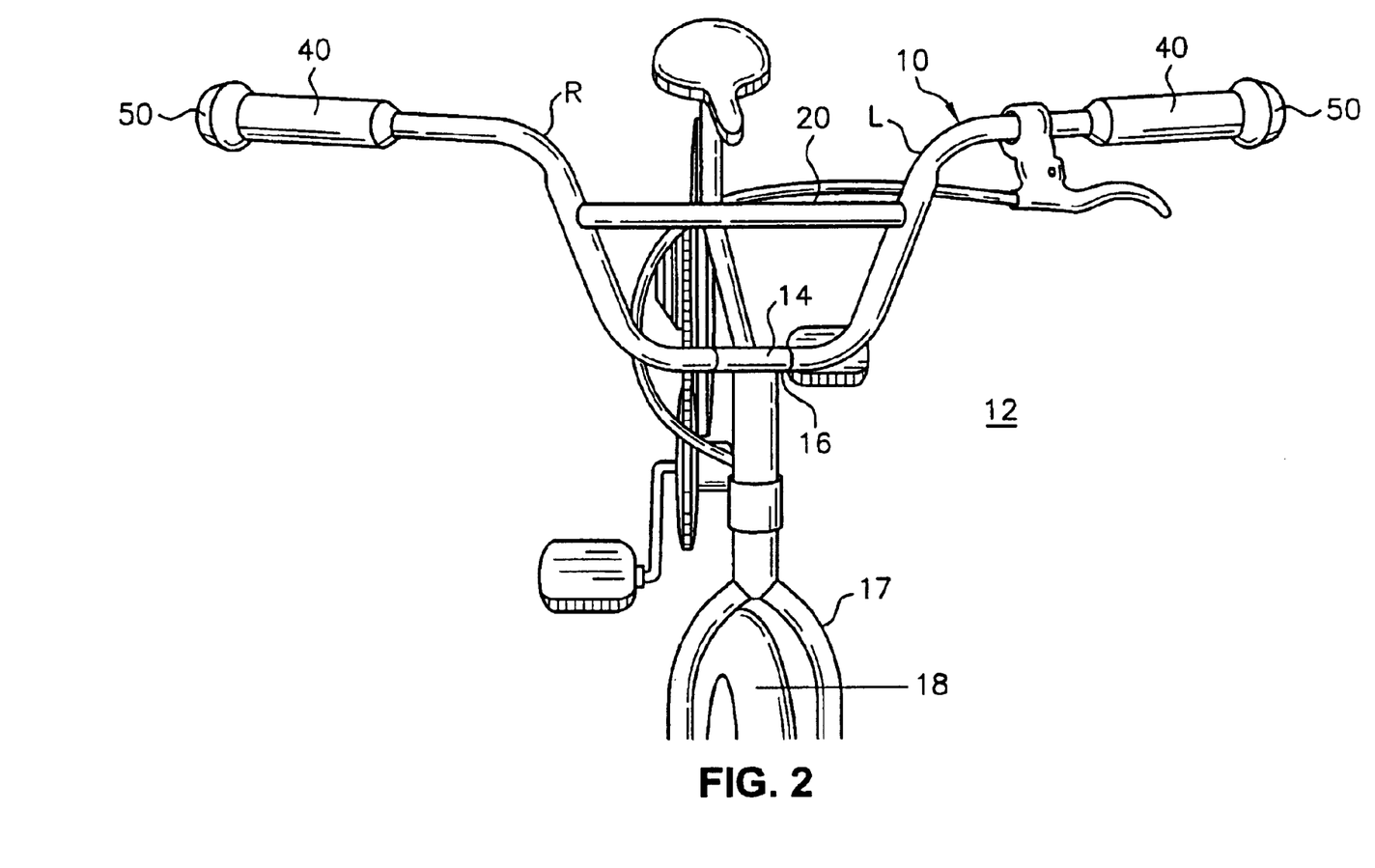
FIG. 2 is a front view of the handlebar mounted onto a bicycle.

Referring now to FIGS. 1 and 2, the present invention is a child-safe handlebar 10 for use on a BMX style bicycle 12. The handlebar 10 can be discussed in relation to its use on a BMX bicycle, those skilled in the art will realize the present invention can be used with handlebars of other styles for other types of bicycles, including but not limited to a single, continuous bent tube, and other forms of personal transportation and toys that are pushed or ridden. Non-limiting examples of personal transportation and toys include tricycles, scooters, pogo-sticks, motorcycles, mopeds, dirt bikes, all terrain vehicles, jet skis, motor-scooters and razor scooters.

The handlebar 10 is provided by a generally tubular frame 21, which includes at least left and right tubular sides L and R, respectively, which extend from a generally horizontal connector bar 14. The connector bar 14 is connected to a generally vertical pivot post or "stem" 16 on the bicycle 12, which defines an axis about which the handlebar 10 rotates. The pivot post 16 is connected to the fork 17 supporting a front wheel 18 on the bicycle 12 such that, when a rider (not shown) turns the handlebar 10 and rotates the pivot post 16, the front wheel 18 turns with the handlebar 10, allowing the rider to steer the bicycle 12. The BMX style handlebar 10 can further include a stabilizer bar 20 which connects the left and right tubular sides L, R together at a location above the connector bar 14. The stabilizer bar 20 can be padded (not shown) as is well known in the art. The stabilizer bar 20 is not part of the present invention and will not be further described herein.

The left and right tubular sides or arms L, R of the handlebar 10 are preferably mirror images of each other, and only the right side R of the handlebar 10 will be described, although the present description will pertain to the left side L of the handlebar 10 as well. The handlebar frame 21 is preferably constructed to steel, although those skilled in the art will realize that the handlebar frame 21 can be other materials and cross-sectional shapes as well.

A first inboard end 22 of the right tubular side R of the handlebar frame 21 is fixedly attached to connector bar 14. An outboard or distal end 24 of the right side R of the handlebar frame 21 is tubular and extends away from the connector base 14, generally at an elevated angle and generally toward the rear of the bicycle 12, as shown in FIG. 2 and also forms an outer or distal end of frame 21.

As shown in cross-section in FIGS. 3 and 4, a tubular shaft 26 is telescopically coupled with, preferably received in and extending outwardly from, the outer end 24 of the handlebar frame 21. The shaft 26 includes a first inner end 30, which is generally slidably disposed within the outer end 24 of the handlebar frame 21. Shaft 26 is thus slidably connected with frame 21. The shaft 26 also includes a second outer or distal end 32 which generally extends outwardly from the outer end 24 of the handlebar frame 21. Preferably, when in an uncompressed state, the shaft 26 extends outwardly from the outer end 24 of the handlebar frame 21 approximately three and a half (3-½) inches, although those skilled in the art will realize that the shaft 26 can extend more or less than three and a half inches from the outer end 24 of the arm R of frame 21 as desired or necessary.

A biasing member, preferably in the form of a helical spring 34, is operatively associated with the shaft 26 and the frame 21 so as to bias the second outer shaft end 32 away from the outer end 24 of the frame 21. Preferably, spring 34 coils around the exterior of the shaft 26 such that a first, inboard end 36 of the spring 34 engages the second end 24 of the handlebar frame 21. The spring 34 is normally in an uncompressed state, although those skilled in the art will realize that the spring 34 can be at least partially compressed in a normal state. The shaft 26 generally serves as a support for spring 34. Preferably, a spring 34 with a k value of 10 lb/in is used, although those skilled in the art will realize that springs with other k values can be used. Also, preferably, the spring 34 is approximately three (3) inches long when in an uncompressed state, although those skilled in the art will realize that the spring 34 can be longer or shorter than three inches when in an uncompressed state.

A cover 40 extends over the spring 34 and the portion of the shaft 26 which is located outboard of the outer end 24 of the handlebar frame 21, as well as a portion of the outer end 24. The cover 40 preferably is slidably disposable over the outer end 24 of the handlebar frame 21 as will be discussed in more detail herein. A first, inboard end 42 of the cover 40 includes an annular wall 44 which is slidable along the exterior of the second end 24 of the handlebar frame 21.

A second, outboard end 46 of the cover 40, distal from the handlebar frame 21, is preferably closed and is fixedly connected to the second end 32 of the shaft 26. A second end 48 of the spring 34 engages the second end 46 of the cover 40, (or of the shaft) biasing the second end 32 of the shaft 26 away from the second end 24 of the handlebar frame 21. The second end 46 of the cover 40 also includes a compressible cap 50 extending outwardly therefrom. Preferably, the cap 50 is constructed of rubber or foam, although those skilled in the art will realize that any compressible material can be used. The cap 50 provides a soft, cushioned surface to distribute an impact force more evenly to the closed end 46 of the cover 40.

Handlebar 10 further includes a dampener operatively associated with at least one of the shaft and the frame so as to slow displacement of the second end of the shaft away from the frame outer end 24. Preferably, the cover 40 encloses first and second generally annular chambers 52, 54, respectively, which are in fluid contact with each other and defined by the cover 40, outer end 25 and shaft 26. A dampening fluid, preferably a dampening grease 56, is provided in the first chamber 52, surrounding the spring 34. Preferably, the dampening grease 56 has a dynamic viscosity of between about 60 and 130 and, more particularly, between 65 and 128.5 N/s-m². (Dynamic viscosity of a fluid is equal to kinematic viscosity times density of the fluid.) NyoGel® 774VL, manufactured by Nye Lubricants in Hockessin, Del., which falls within the preferred range, has been used as the dampening grease 56, although those skilled in the art will realize that other lubricants, including other greases or fluids, can be used. The dampening grease 56 provides a dampening effect similar to the hydraulic oil used in automobile shock absorbers. The first chamber 52 is separated from a second chamber 54 by a generally annular wall 58 which extends radially outwardly from the second end 24 of the handlebar frame 21 but is slidably engaged with the interior of the cover 40. Two or more one-way valves 60, 64 are provided. Preferably, first one-way valve 60 with a relatively larger opening allows the dampening grease 56 to be transferred from the first chamber 52 to the second chamber 54. Preferably, second one-way valve 64 with a relatively smaller opening allows the dampening grease 56 to be transferred from the second chamber 54 to the first chamber 52 more slowly than the transfer of the grease 56 through first valve 60. Preferably, the second chamber 54 is also filled with dampening grease 56 to avoid forming any air pockets that could adversely affect the operation of the dampening system. Although larger and smaller individual valves are described, it will be appreciated that greater numbers of smaller individual valves can be provided to pass dampening grease from the first to the second chambers. Valves 60, 64 can be of any construction. Flap or slit valves are suggested.

An O-ring 66 or other seal known to those skilled in the art preferably is fixedly attached to the annular wall 44 at an interface between the annular wall 44 and the second end 24 of the handlebar frame 21 to prevent dampening grease 56 from leaking out of the second chamber 54 and onto the outer surface of the handlebar frame 21.

Normally, the spring 34 is an uncompressed state or alternately, in a partially compressed state, as shown in FIG. 3. When the bicycle 12 encounters an obstacle (not shown) that causes the bicycle 12 to suddenly stop, the front wheel 18 of the bicycle 12 tends to turn and the rider is thrown into one of the two distal ends of the handlebar 10 rotated with the wheel 18 toward the rider (e.g., the outer end 24 of the frame 21). The rider's body contacts the cap 50 and the second end 46 of the cover 40, forcing shaft 26 into the handlebar frame 21, generally with an axial impacting force. The rider can additionally fall on that handlebar end if the rider and bike continue to fall over together. The cap 50 compresses and slows and distributes the impact force throughout the second end 46 of the cover 40. The cover 40 and the shaft 26 then axially translate inward along the outer end 24 of the handlebar frame 21 (to the left in FIGS. 3 and 4) at a rate and distance which is proportional to the magnitude of the impact force. The second end 48 of the spring 34 is compressed toward the first end 36 of the spring. The spring 34 resists the impact force and gradually slows down the rider as the rider compresses the spring 34, absorbing a portion of the energy of impact.

As the cover 40 is inwardly translated, the first chamber 52 is compressed and the second chamber 54 is expanded, forcing the dampening grease 56 from the first chamber 52, through the first one-way valve 60, and into the second chamber 54. The second one-way valve 64 is closed at this time. Due to the relatively large size of the first one-way valve 60, the transfer of the dampening grease 56 from the first chamber 52 to the second chamber 54 does not significantly affect the compression rate or distance of the spring 34.

Upon compression, spring 34 stores a portion of the energy of impact. This energy is released upon release of the force from the second end 46 of the cover 40. The energy stored in spring 34 during compression acts to extend the spring 34 toward its initial, preferably uncompressed condition and return the shaft 26 and cover 40 to their initial positions. As the spring 34 expands, the second chamber 54 is compressed and the first chamber 52 is expanded, forcing the dampening grease 56 through the second one-way valve 64. The first one-way valve 60 is closed at this time. However, since the second one-way valve 64 is relatively small compared to the first one-way valve 60, the dampening grease 56 does not flow as swiftly from the second chamber 54 into the first chamber 52 as the dampening grease 56 flowed from the first chamber 52 into the second chamber 54, thus dampening the return speed of the spring 34 and preventing the second end 46 of the cover 40 from springing back into the rider and causing additional harm to the rider.

In a second embodiment handlebar 110, one outer end 124 of which is shown in cross-section in FIG. 5, the dampening grease 56 and first and second valves 60, 64 are eliminated and an air flow dampener is employed, preferably a feather washer 156. Feather washer 156 is a generally resilient or elastic cup-shaped member with a feathered outer edge and is used in hydraulic and/or pneumatic systems as a combined valve and seal. The feather washer 156 is preferably located on the first (inner) end 130 of a shaft 126, which is slidably received in the tubular distal or outer end 124 of handlebar frame 121, as shown in FIG. 5. The use of a feather washer 156 in a tube should be well known to those skilled in the art. The washer 156 is oriented to allow air to easily pass by the outside of the washer 156 when the feather washer 156 and the shaft 126 are forced inwardly (during compression), but to "flap out" as air attempts to pass by the feather washer 156 when the compressed spring 134 moves the cover 140 and washer 156 outwardly from outer end 124 (during spring expansion). Another seal 160 is preferably provided around the distal end 124 of frame 121 to form a seal for chamber 152 within cover 40. This chamber 152 reduces in volume as the distal end 146 of cover 140 moves inward over the distal end 124 of handlebar frame 121. Seal 160 is at least partially retained in position by a generally radially outwardly projecting wall 170 over which an inner cylindrical surface of cover 140 slides as it telescopes on frame end 124. Chamber 152 is defined b the line surface of cover 140, seal 160 and wall 170.

The second embodiment shows an alternative compressible cap 150 to the cap 50 of the first embodiment. The alternative cap 150 is preferably a foam ball which is mounted to the exterior of the outer or distal end 146 of the cover 140 by being slipped over and adhered to a stem 151. The foam ball constituting cap 150 provides a larger surface area of an elastic material which is exposed to the rider on impact. However, those skilled in the art will realize that either cap 50, 150 or any similar resilient or elastic endpiece can be used in either the first or second embodiments, or the endpiece can be of the known type and need not be elastic. They would also realize that stem 151 could be eliminated and the cap 150 held to the outer end 146 of cover 140 by a fastener through the ball and into the end of cover 140.

In operation, when struck by the rider, the shaft 126 and the cover 140 are inwardly translated along the outer or distal end 124 of the handlebar and the spring 134 is compressed as a result of the impact force upon the outer or distal end 146 of the cover 140, air in the chamber 152 passes by the feather washer 156 and into the frame 121 without significantly affecting the compression rate of the spring 134.

After the impact force is released from the second (outer) end 146 of the cover 140, the spring 134 expands, forcing the shaft 126 back toward its pre-impact position. However, the feather washer 156 "flaps out," creating resistance to air flow within the shaft 126 and the handlebar frame 121, slowing down the return speed of the spring 134 and the shaft 126, and preventing the outer or distal end 146 of the cover 140 from springing back into the rider and causing additional harm to the rider.

FIG. 5 shows the outer or distal end 146 of the cover 140 being a separate piece screw threaded into a threaded end of a cylindrical portion 140a of the cover 140. This feature, as are several other features shown, is for assembly purposes only and those skilled in the art will realize that other methods of connecting the second end 146 of the cover 140 to the second end 124 of the handlebar 110. For example, the second frame end 124 might be provided by a separate tubular member which is coupled by a threaded or compression collar 164 (in phantom) or otherwise fixedly joined to the distal end of the left and right arms L, R, for example, by fasteners or welds (not depicted).

Use of the handlebar 10, 110 results in approximately a 50% reduction of impact force transmitted to a rider as compared to a standard bicycle handlebar in collisions described above.

The present invention can be retrofit to a BMX bicycle, those skilled in the art will realize that the present invention can also be retrofit with handlebars of other styles for other types of bicycles, including but not limited to a single, continuous bent tube, and other forms of a personal transportation and toys that are pushed or ridden. Non-limiting examples of personal transportation and toys include tricycles, scooters, pogo-sticks, motorcycles, mopeds, dirt bikes, all terrain vehicles, jet skis, motor-scooters and razor scooters.

Figure 6A:
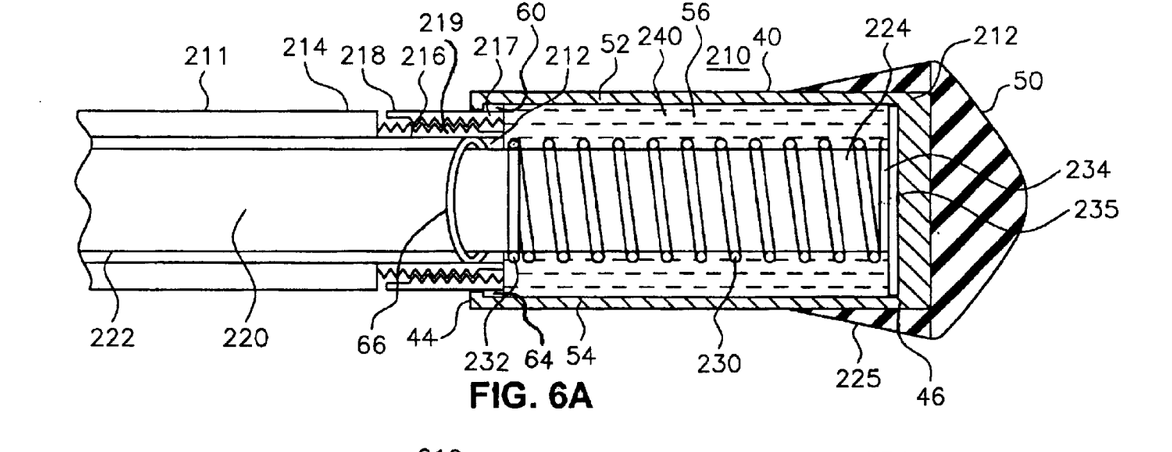
FIG. 6A is a cross-sectional view of an end of the safety handlebar of a fluid dampened embodiment of the present invention retrofitted to a shaft of a conventional bicycle.
Figure 6B:
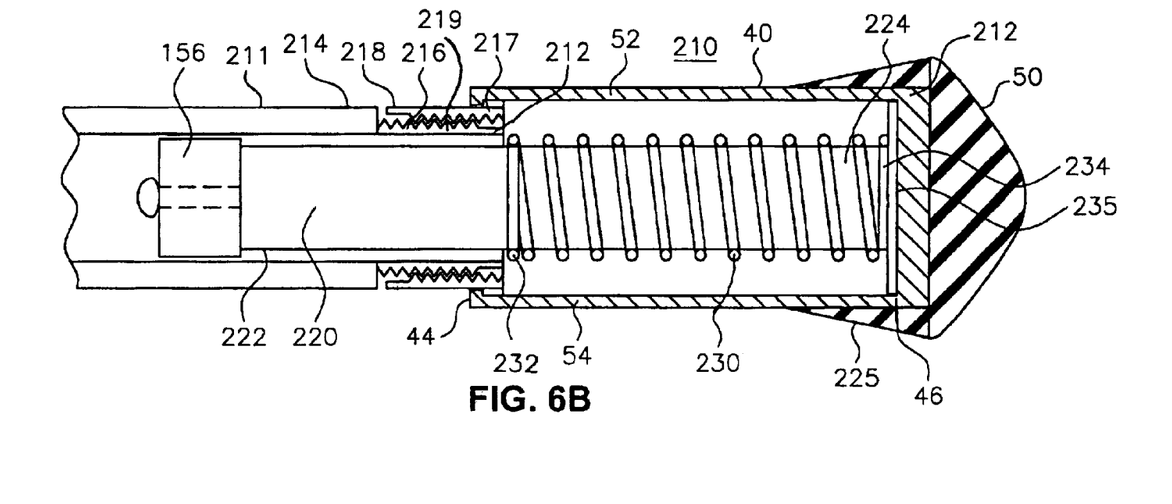
FIG. 6B is a cross-sectional view of an end of the safety handlebar of a feather washer dampened embodiment of the present invention retrofitted to a shaft of a conventional bicycle.
Figure 7:
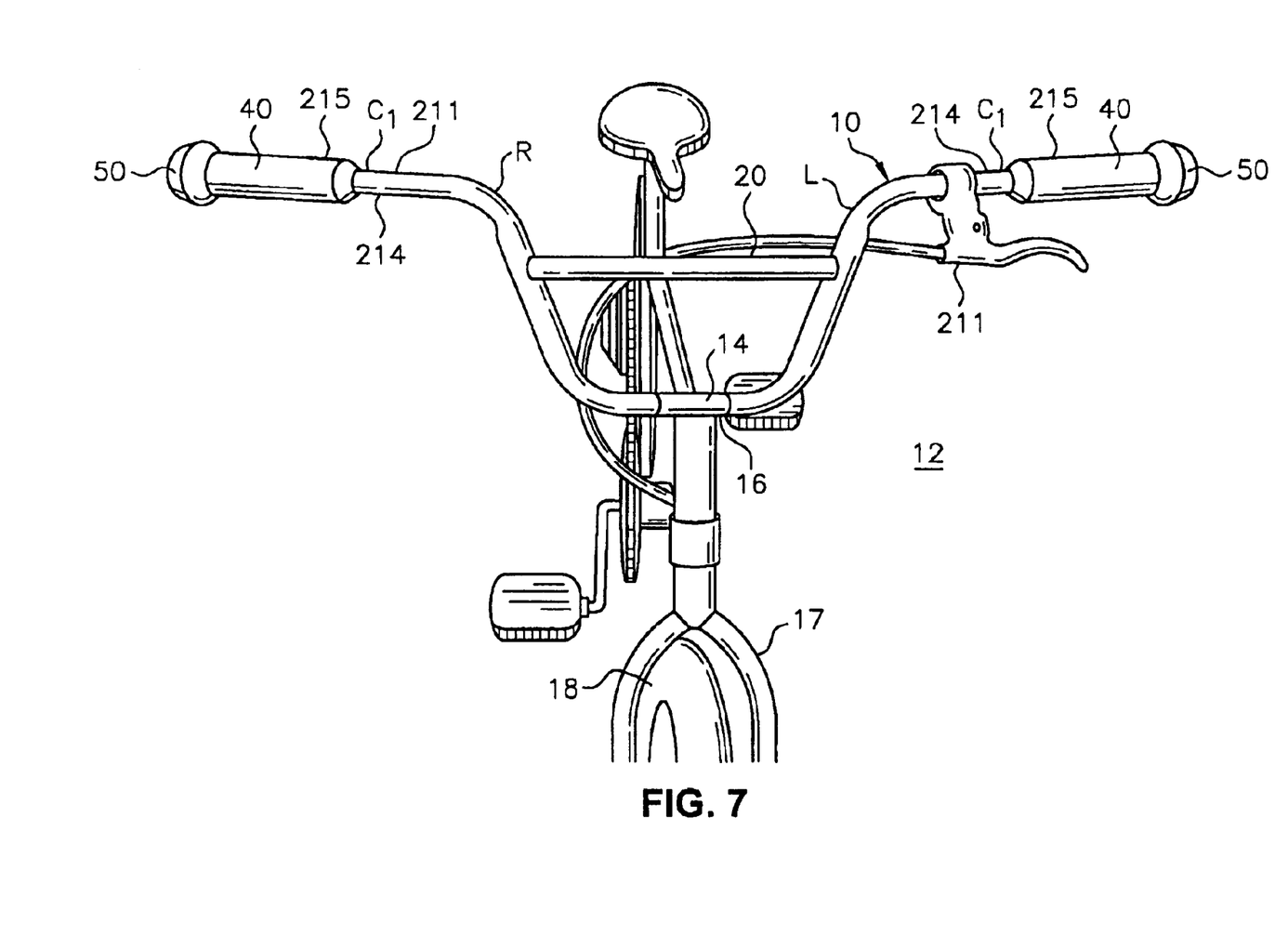
FIG. 7 is a perspective view of an alteration of the shaft of the conventional bicycle.

FIGS. 6A, 6B, and 7 illustrate alternative embodiments of retrofit handlebar 210 coupled to a shaft of handlebar frame 211. Handlebar frame 211 includes outboard end 212 extending away from the frame (not shown), generally at an elevated angle and generally toward the rear of the bicycle 12, as shown in FIG. 2. Shaft 214 is formed at outer end 212 of handlebar frame 211. Handlebar frame 211 can be a conventional bicycle frame. Alternatively handlebar frame 211 can be attached or integrated to other forms of personal transportation and toys. Non-limiting examples of personal transportation and toys include tricycles, scooter (e.g., RAZOR scooters, etc.), pogo-sticks, motorcycles, mopeds, dirt bikes, all terrain vehicles, jet-skis, and motor scooters. Handlebar frame 211 can be tubular and is preferably constructed of steel, although those skilled in the art will realize that handlebar frame 211 can be formed of other material and cross-sectional shapes as well.

In the retrofitting method of the present invention, a cut $C_1$ is made in shaft 214 of handlebar frame 211 separating handle 215 from shaft 214, as shown in FIG. 7. Handle 215 can be a conventional bicycle handle. Exterior surface 216 of shaft 214 is threaded, such as by conventional methods. Interior surface 217 of lower housing 218 of safety handlebar 210 is threaded, such as by conventional methods. During attachment, exterior surface 216 of handlebar frame 211 is threaded onto interior surface 217 of retrofit safety handlebar 210, as shown in FIGS. 6A and 6B.

Shaft 220 of retrofit safety handlebar 210 is received in and extends outwardly from outer end 212 of handlebar frame 211. Shaft 220 can be tubular. Shaft 220 includes inner end 222, which is generally slidably disposed within outer end 212 of handlebar frame 211. Shaft 220 also includes outer end 224 which extends into upper housing 225 of retrofit safety handlebar 210. Biasing member 230 is associated with shaft 220 and handlebar frame 211 so as to bias outer end 224 of shaft 220 away from handlebar frame 211. Bias member 230 coils around the exterior of shaft 220 such that a first, inboard end 232 of the bias member 230 engages outer end 219 of handlebar frame 211 and second, outboard end 234 of bias member 230 engages top 235 of upper housing 225. Bias member 230 is normally in an uncompressed state, although those skilled in the art will realize that bias member 230 can be at least partially compressed in a normal state.

Retrofit safety handlebar 210 further includes dampener 240 operatively associated with at least one of shaft 220 and handlebar frame 211 so as to slow displacement of the second outboard end 234 of shaft 220 away from outer end 212 of handlebar frame 211. Dampener 240 can be formed of dampening fluid 56 and annular chamber 52, 54, valves 60, 64, as described above with regard to FIGS. 3 and 4. Alternatively, dampener 240 can be an air flow dampener, such as a feather washer disclosed above with regard to FIG. 5.

Cover 40 extends over bias member 230 and the portion of shaft 220 which is located outboard of the outer end 212 of the handlebar frame 211, as well as a portion of outer end 212. Cover 40 preferably is slidably disposable over outer end 212 of handlebar frame 211. A first, inboard end 42 of the cover 40 includes an annular wall 44 which is slidable along the exterior of outer end 212 of handlebar frame 211.

Second end 46 of cover 40 also includes a compressible cap 50 extending outwardly there from. Preferably, cap 50 is constructed of rubber or foam, although those skilled in the art will realize that any compressible material can be used. Cap 50 provides a soft, cushioned surface to distribute an impact force more evenly.

Applicant's provisional Patent Application No. 60/156,758 is incorporated by reference herein in its entirety including all appendices.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A retrofit safety handlebar comprising:
    a housing having a threaded interior surface, said threaded interior surface being adapted to be threaded onto a threaded exterior surface of an outer end of a handlebar frame;
    a shaft having a first end and a second end, said first end of said shaft being slidably received in said outer end of said handlebar;
    a bias member operatively associated with said shaft and said handlebar frame so as to bias said second end of said shaft away from said outer end of said handlebar frame; and
    a dampener operatively associated with said shaft and said handlebar frame so as to dampen displacement of said second end of said shaft away from said handlebar frame in response to compression of the bias member from a pre-impact position to a compressed position by an impact force with said handlebar frame, such that after the impact force is released, said dampener slows a return speed of said bias member from the compressed position to the pre-impact position for preventing the second end from springing back to a second end pre-impact position at an undampened return speed, wherein the dampener is further adapted to dampen expansion of the bias member from the compressed position to the pre-impact position more than compression of the bias member from the pre-impact position to the compressed position.

2. The handlebar according to claim 1 wherein said bias member is a helical spring.

3. The handlebar according to claim 1 further comprising a compressible cap coupled with said second end of said shaft for movement with said second end of said shaft.

4. The handlebar according to claim 1 further comprising a cover coupled with said shaft to slidably telescope on said outer end of said handlebar frame.

5. The handlebar according to claim 1 wherein said dampener comprises:
    an air flow damper operatively connected to said first end of said shaft such that the air flow damper is in a first, non-fluid flow obstructing orientation when said second end of said shaft is displaced toward said handlebar frame, and said air flow damper is in a second, fluid flow obstructing position when said bias member displaces said second end of said shaft away from said handlebar frame so as to slow displacement of said second end of said shaft away from said handlebar frame.

6. The handlebar according to claim 5 wherein said bias member is a helical spring.

7. The handlebar according to claim 5 wherein said air flow damper is a feather washer.

8. The handlebar according to claim 5 further comprising a compressible cap coupled for movement with said second end of said shaft.

9. The handlebar of claim 1 wherein said handlebar frame is part of a bicycle.

10. The handlebar of claim 1 wherein said handlebar frame is attached or integral to a member selected from the group consisting of a tricycle, a scooter, a pogo-stick, a motorcycle, a moped, a dirt bike, an all terrain vehicle, a jet ski, and a motor-scooter.

11. A retrofit safety handlebar comprising:
   a housing having a threaded interior surface, said threaded interior surface being adapted to be threaded onto a threaded exterior surface of an outer end of a handlebar frame;
   a shaft having a first end and a second end, said first end of said shaft being slidably received in said outer end of said handlebar;
   a bias member operatively associated with said shaft and said handlebar frame so as to bias said second end of said shaft away from said outer end of said handlebar frame; and
   a dampener operatively associated with said shaft and said handlebar frame so as to dampen displacement of said second end of said shaft away from said handlebar frame, said dampener comprising:
   a first chamber associated with said second end of said shaft;
   a second chamber associated with said first end of said shaft;
   a dampening fluid contained within at least one of said first and second chambers;
   a first one-way valve fluidly connecting said first chamber to said second chamber that allows the dampening fluid to flow only from said first chamber to said second chamber; and
   a second one-way valve fluidly connecting said second chamber to said first chamber that allows the dampening fluid to flow only from said second chamber to said first chamber, said second one-way valve having an opening smaller than an opening in said first one-way valve.

12. The handlebar according to claim 11 further comprising a cover extending over the shaft between said second end of said shaft and said outer end of said handlebar frame, a first end of said cover being slidably disposed over said outer end of said handlebar frame and a second end of said cover being fixedly coupled with said second end of said shaft so as to telescope with said shaft along said outer end of said handlebar frame; and an annular wall extending radially outwardly from the outer frame end, a radial end of the wall being slidably disposed against the cover.

13. The handlebar according to claim 12 wherein said first chamber is defined at least in part by said annular wall, said cover, and said shaft.

14. The handlebar according to claim 12 wherein said second chamber is defined at least in part by said annular wall, said cover, and said frame.

15. The handlebar according to claim 11 wherein said dampening fluid is dampening grease.

16. The handlebar according to claim 11 wherein said bias member is a helical spring.

17. The handlebar according to claim 11 further comprising a compressible cap affixed with said second end of said shaft.

18. A retrofit child-safe handlebar comprising:
   a housing having a threaded interior surface, said threaded interior surface being adapted to be threaded onto a threaded exterior surface of an outer end of tubular handlebar frame;
   a shaft having opposing a first end and a second end, the first end of said shaft being slidably telescoped with said outer end of said handlebar frame;
   a fluid dampener operatively associated with said outer end of said handlebar frame and said shaft to slow movement of said shaft out of said outer end of said handlebar frame more than compression of said shaft into said outer end of said handlebar frame.

19. The handlebar of claim 18 wherein said dampener comprises:
   a first chamber associated with said second end of said shaft; and
   a dampening fluid contained within said first chamber.

20. The handlebar of claim 18 further comprising:
   a second chamber associated with said first end of said shaft and at least one valve fluidly coupling said first chamber and second chamber.

21. The handlebar of claim 18 wherein said dampener comprises:
   an air flow damper operatively connected to said first end of said shaft such that the air flow damper is in a first, non-fluid flow obstructing orientation when said second end of said shaft is displaced toward said handlebar frame, and said air flow damper is in a second, fluid flow obstructing position when said bias member displaces said second end of said shaft away from said handlebar frame so as to slow displacement of said second end of said shaft away from said handlebar frame.

22. The handlebar of claim 18 wherein said handlebar frame is part of a bicycle.

23. The handlebar of claim 18 wherein said handlebar frame is attached or integral to a member selected from the group consisting of a tricycle, a scooter, a pogo-stick, a motorcycle, a moped, a dirt bike, an all terrain vehicle, a jet ski, and a motor-scooter.

24. The handlebar of claim 18 further comprising:
   a biasing member coupled between said shaft and said handlebar frame so as to absorb energy as the shaft slides into the outer end of the frame.

25. A method for retrofitting a first retrofit safety handlebar to a second handlebar comprising the steps of:
   threading an exterior outer end of said second handlebar to form a threaded exterior outer end;
   threading a threaded interior surface of a housing of said first retrofit safety handlebar to said threaded exterior outer end, said retrofit safety handlebar comprising: a shaft having a first end and a second end; a bias member and a dampener slidably receiving said first end of said shaft in an outer end of said handlebar;
   operatively associating said bias member with said shaft and said handlebar frame so as to bias said second end of said shaft away from said outer end of said handlebar frame; and
   operatively associating said dampener with said shaft and said handlebar frame so as to dampen displacement of said second end of said shaft away from said handlebar frame in response to compression of the bias member from a pre-impact position to a compressed position by an impact force with said handlebar frame, such that after the impact force is released, said dampener slows a return speed of said bias member from the compressed position to the pre impact position for preventing the second end from springing back to a second end pre-impact position at an undampened return speed, wherein the dampener is further adapted to dampen expansion of the bias member from the compressed position to the pre-impact position more than compression of the bias member from the pre-impact position to the compressed position.

26. The method of claim 25 wherein said second handlebar further comprises a handle coupled to said outer end of said second handlebar and further comprising the step of:

separating said handle from said outer end second handlebar to form said exterior outer end of said second handlebar before said step of threading said exterior outer end.

* * * * *